US012479695B2

(12) United States Patent
Ishihara et al.

(10) Patent No.: US 12,479,695 B2
(45) Date of Patent: Nov. 25, 2025

(54) EMERGENCY REPORT SYSTEM FOR ELEVATOR

(71) Applicant: Mitsubishi Electric Corporation, Tokyo (JP)

(72) Inventors: Sho Ishihara, Tokyo (JP); Mitsumasa Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1414 days.

(21) Appl. No.: 17/054,774

(22) PCT Filed: Aug. 2, 2018

(86) PCT No.: PCT/JP2018/029123
§ 371 (c)(1),
(2) Date: Nov. 12, 2020

(87) PCT Pub. No.: WO2020/026421
PCT Pub. Date: Feb. 6, 2020

(65) Prior Publication Data
US 2021/0253395 A1 Aug. 19, 2021

(51) Int. Cl.
*B66B 1/34* (2006.01)
*B66B 1/46* (2006.01)
*B66B 5/00* (2006.01)

(52) U.S. Cl.
CPC ............ *B66B 1/468* (2013.01); *B66B 5/0031* (2013.01)

(58) Field of Classification Search
CPC .............................. B66B 1/468; B66B 5/0031
USPC .......................................................... 187/380
See application file for complete search history.

(56) References Cited

U.S. PATENT DOCUMENTS 6,086,450 A * 7/2000 Mankovitz ............... A41C 3/00 450/20
10,129,390 B2 * 11/2018 Huotari ..................... B66B 5/00
10,766,740 B2 * 9/2020 Li ......................... B66B 1/3492

FOREIGN PATENT DOCUMENTS

JP 2007-235410 A 9/2007
JP 2017-105609 A 6/2017

OTHER PUBLICATIONS

International Search Report and Written Opinion mailed on Oct. 2, 2018 for PCT/JP2018/029123 filed on Aug. 2, 2018, 9 pages including English Translation of the International Search Report.

* cited by examiner

*Primary Examiner* — Erick D Glass
(74) *Attorney, Agent, or Firm* — XSENSUS LLP

(57) ABSTRACT

An object of the present invention is to provide an emergency report system (1) that may detect that pressing of a phone call button (13) is continued based on a calling state retained even after pressing of the phone call button (13) is finished. The calling state is stored when the phone call button (13) of an interphone extension unit (8) is pressed inside a car (6). Storing of the calling state is retained even after pressing of the phone call button (13) is finished. Continuation of pressing of the phone call button (13) is detected by detecting storing of the calling state performed again, the storing being canceled at a time interval set in advance.

20 Claims, 7 Drawing Sheets

EMERGENCY REPORT SYSTEM FOR ELEVATOR

CROSS-REFERENCE TO RELATED APPLICATION

The present application is based on PCT filing PCT/JP2018/029123, filed Aug. 2, 2018, the entire contents of which are incorporated herein by reference.

FIELD

The present invention relates to an emergency report system for an elevator.

BACKGROUND

PTL 1 discloses an example of an emergency report system for an elevator. The emergency report system detects an operation of a calling device. The emergency report system thereafter instructs a user on an operation. When the user performs the instructed operation in a time set in advance, the emergency report system enables a phone call between an interphone provided in a car and a monitoring center on the outside of an elevator. Accordingly, unnecessary communication between the interphone and the monitoring center is inhibited.

CITATION LIST

Patent Literature

[PTL 1] JP 2017-105609 A

SUMMARY

Technical Problem

An emergency report system disclosed in PTL 1 distinguishes an operation for necessary communication and an operation for unnecessary communication in accordance with an additional operation by a user. Thus, the user has to determine an operation to be additionally performed following an operation instructed on the spot in an emergency. However, when it may be detected that a calling device is continuously operated, the emergency report system may distinguish the necessary communication and the unnecessary communication without instructing the user on an additional operation. Here, in an interphone or the like, for convenience of the user, a calling state may be retained by a latch circuit or the like even after an operation of the calling device is finished. In this case, even if the operation of the calling device is not continued, the calling state is retained. Consequently, continuation of the operation of the calling device is not detected based on the calling state.

The present invention has been made to solve such a problem. An object of the present invention is to provide an emergency report system for an elevator that may detect that an operation of a calling device is continued based on a calling state retained even after the operation of the calling device is finished.

Solution to Problem

An emergency report system for an elevator according to the present invention, the emergency report system is provided with: a state storing unit storing a calling state when a calling device of a first telephone is operated inside a car of the elevator, the state storing unit retaining storing of the calling state even after an operation of the calling device is finished; and a detection unit canceling storing of the calling state by the state storing unit at a time interval set in advance, the detection unit detecting that the operation of the calling device is continued by detecting storing of the calling state, the storing being again performed by the state storing unit.

An emergency report system for an elevator according to the present invention, the emergency report system is provided with: a first telephone being provided inside a car of the elevator, storing a calling state when a calling device is operated, and retaining storing of the calling state even after an operation of the calling device is finished; and an emergency report device canceling storing of the calling state by the first telephone at a time interval set in advance, the emergency report device detecting that the operation of the calling device is continued by detecting storing of the calling state, the storing being again performed by the first telephone.

Advantageous Effects of Invention

In the present invention, in an emergency report system, a calling state is stored when a calling device of a first telephone is operated inside a car of an elevator. Storing of the calling state is retained even after an operation of the calling device is finished. Continuation of the operation of the calling device is detected by detecting storing, which is again performed, of the calling state whose storing is canceled at a time interval set in advance. Accordingly, it may be detected that the operation of the calling device is continued based on the calling state retained even after the operation of the calling device is finished.

DESCRIPTION OF EMBODIMENTS

Figure 1:
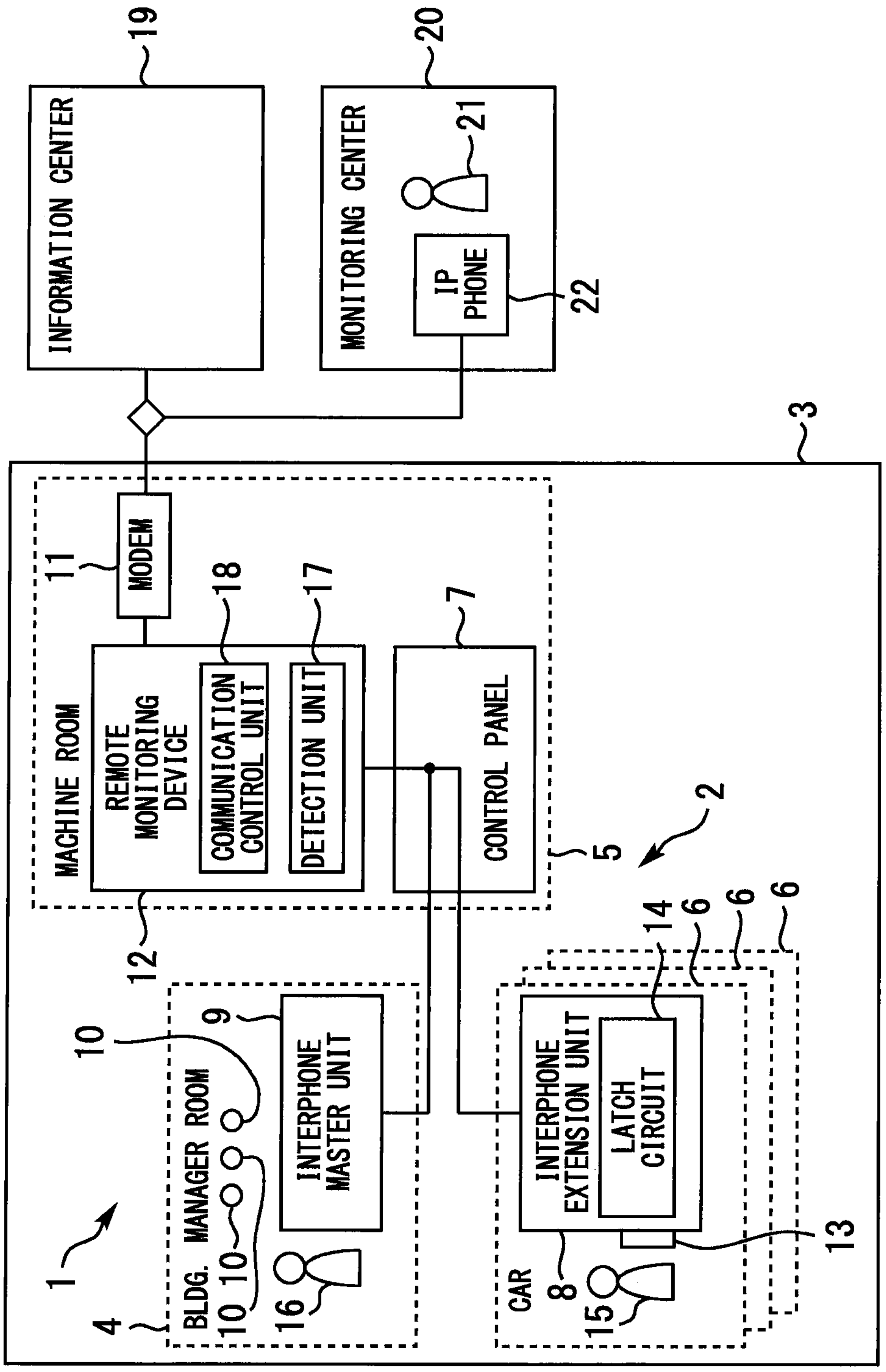
FIG. 1 is a block diagram of an emergency report system according to Embodiment 1.

An embodiment of the present invention will be described with reference to the attached drawings. The same reference characters are given to the same or corresponding components in each figure, and repeated descriptions will appropriately be simplified or omitted.

Embodiment 1

FIG. 1 is a block diagram of an emergency report system according to Embodiment 1.

An emergency report system 1 is applied to an elevator 2. The elevator 2 is provided in a building 3. The building 3 has a building manager room 4. The building 3 has plural floors. In the elevator 2, each of plural shafts not illustrated passes through each floor of the building 3. In the elevator 2, a machine room 5 is provided above the plural shafts, for example. The elevator 2 includes plural cars 6 and a control panel 7.

Each of the plural cars 6 is provided to be capable of moving up and down inside each of the plural shafts by a traction machine not illustrated, for example.

The control panel 7 is provided in the machine room 5, for example. The control panel 7 is a device controlling behavior of the elevator 2. The behavior of the elevator 2 includes upward and downward movement of each of the plural cars 6. The control panel 7 is connected with sensors, switches, and so forth, the sensors, switches, and so forth being provided to the plural cars 6 or the like and not illustrated, so as to be capable of collecting information indicating a state of the elevator 2.

The emergency report system 1 includes plural interphone extension units 8, an interphone master unit 9, plural indicators 10, a modem 11, and a remote monitoring device 12.

Each of the plural interphone extension units 8 is an example of a first telephone. Each of the plural interphone extension units 8 is provided to each of the plural cars 6. Each of the plural interphone extension units 8 is connected with the control panel 7. Each of the plural interphone extension units 8 includes a phone call button 13 and a latch circuit 14.

The phone call button 13 is an example of a calling device. The phone call button 13 is operated by being pushed by a user 15. An operation of the phone call button 13 is finished when the user 15 releases the phone call button 13.

The latch circuit 14 is an example of a state storing unit. The latch circuit 14 is provided to each of the plural interphone extension units 8. The latch circuit 14 is a circuit storing a calling state when the phone call button 13 is operated. The latch circuit 14 is a circuit retains storing of the calling state even after the user 15 releases the phone call button 13. The latch circuit 14 is connected with the control panel 7 so as to be capable of performing communication of a signal indicating storing of the calling state.

The interphone master unit 9 is an example of a second telephone. The interphone master unit 9 is provided in the building manager room 4. The building manager room 4 is a place on the outside of the plural cars 6. The building manager room 4 is a place where a manager 16 resides. The interphone master unit 9 is connected with the control panel 7. The interphone master unit 9 is connected with the interphone extension unit 8 provided to each of the plural cars 6 by relay of the control panel 7. The interphone master unit 9 is connected with the latch circuit 14 of the interphone extension unit 8 provided to each of the plural cars 6. The interphone master unit 9 includes a speaker, a bell, or the like ringing while the latch circuit 14 of the interphone extension units 8 of any of the plural cars 6 retains storing of the calling state. The manager 16 hooks off a handset, for example, when the interphone master unit 9 is ringing, and a response from the interphone master unit 9 is thereby started.

The plural indicators 10 are an example of an indication device. The plural indicators 10 are provided in the building manager room 4. Each of the plural indicators 10 corresponds to each of the plural cars 6. Each of the plural indicators 10 is a device being lit while the latch circuit 14 of the interphone extension unit 8 provided to the corresponding car 6 retains storing of the calling state.

The remote monitoring device 12 is an example of an emergency report device. The remote monitoring device 12 is provided in the machine room 5. The remote monitoring device 12 is connected with the control panel 7. The remote monitoring device 12 includes a detection unit 17 and a communication control unit 18.

The detection unit 17 stores N seconds as a set time being a time defined in advance. The set time is seven seconds, for example. The detection unit 17 is a unit detecting that the phone call button 13 is continuously pushed.

The communication control unit 18 is a unit controlling communication from the interphone extension unit 8.

The modem 11 is provided in the machine room 5. The modem 11 is connected with the remote monitoring device 12. The modem 11 is a device performing modulation and demodulation of a signal indicating data so as to be capable of performing communication of the data indicating the state of the elevator 2, the data being collected by the control panel 7. The modem 11 is a device performing modulation and demodulation of a signal indicating a call so as to be capable of performing communication of the call from each of the plural interphone extension units 8.

In the control panel 7 in FIG. 1, control of an interphone signal is not performed. That is, the control panel 7 performs only relays for communication among the interphone extension units 8, the interphone master unit 9, and the remote monitoring device 12.

An information center 19 is provided on the outside of the elevator 2 with respect to the emergency report system 1. The information center 19 receives data indicating the state of the elevator 2 through the modem 11. The information center 19 is a base accumulating the received data indicating the state of the elevator 2, for example. In the information center 19, data about the elevator 2 and other elevators are accumulated. In the information center 19, a server and a client are provided, for example. In this case, the modem 11 of the emergency report system 1 is connected with the server of the information center 19 via a VPN (virtual private network), for example.

A monitoring center 20 is provided on the outside of the elevator 2 with respect to the emergency report system 1. The monitoring center 20 receives a call from each of the plural interphone extension units 8 through the modem 11. The monitoring center 20 is a base in which an operator 21 resides, the operator 21 handling a call from the interphone extension unit 8. In the monitoring center 20, states of the elevator 2 and the other elevators are monitored. In the monitoring center 20, for example, an IP phone 22 (IP: Internet protocol) is provided. The IP phone 22 is used for handling by the operator 21. In this case, the modem 11 of the emergency report system 1 is connected with the IP phone 22 of the monitoring center 20 by VoIP (voice over IP), for example, via the VPN.

By continuing using FIG. 1, functions of the emergency report system 1 will be described.

The latch circuit 14 provided to each of the plural interphone extension units 8 stores a standby state before the phone call button 13 is pushed.

When the user 15 riding any of the plural cars 6 contacts the manager 16 on the outside of the car 6, the user 15 pushes the phone call button 13 of the interphone extension unit 8 provided in the car 6. The latch circuit 14 of the interphone extension unit 8 detects that the phone call button 13 is pushed. The latch circuit 14 stores the calling state. The latch circuit 14 transmits a signal indicating that the calling state is stored to the interphone master unit 9 and the remote monitoring device 12 through the control panel 7.

Even after the user 15 releases the phone call button 13 of the interphone extension unit 8, the latch circuit 14 of the interphone extension unit 8 retains storing of the calling state. The interphone master unit 9 continue to ring while the latch circuit 14 of the interphone extension unit 8 retains storing of the calling state. The indicator 10 corresponding to the car 6 which the user 15 rides is lit while the latch circuit 14 of the interphone extension unit 8 provided to the car 6 retains storing of the calling state.

The interphone master unit 9 notifies to the manager 16 by ringing that the phone call button 13 is pushed in any of the plural cars 6. The plural indicators 10 notify the car 6 which the user 15 pushing the phone call button 13 rides to the manager 16 by being lit.

The detection unit 17 of the remote monitoring device 12 receives a signal through the control panel 7 and thereby detects storing of the calling state by the latch circuit 14. The detection unit 17 starts measurement of a time by a built-in timer.

The communication control unit 18 judges whether a response from the interphone master unit 9 is made before a set time elapses after the detection unit 17 detects storing of the calling state by the latch circuit 14.

When the manager 16 hooks off the handset of the interphone master unit 9, the interphone master unit 9 transmits a signal indicating off-hook to the remote monitoring device 12 through the control panel 7. In this case, the communication control unit 18 judges that a response from the interphone master unit 9 is made.

When it is judged that a response from the interphone master unit 9 is made, the communication control unit 18 causes the control panel 7 to relay a phone call between the interphone extension unit 8 whose phone call button 13 is pushed and the interphone master unit 9. When the phone call between the interphone extension unit 8 and the interphone master unit 9 is finished, the latch circuit 14 of the interphone extension unit 8 stores the standby state.

On the other hand, in a case where the communication control unit 18 judges that no response from the interphone master unit 9 is made, the detection unit 17 judges whether the phone call button 13 is continuously pushed. A judgment by the detection unit 17 is performed as follows, for example.

The detection unit 17 stands by for n seconds as a time defined in advance. A value of n is approximately 0.1 or a numerical value greater than this. For example, the value of n is one. While the detection unit 17 stands by, a performance for rate-controlling of processing of a signal, communication, or the like is performed in hardware or software in the interphone master unit 9, the interphone extension unit 8, the control panel 7, or the like.

The detection unit 17 measures the time in which the phone call button 13 is continuously pushed by counting the number of performances of standby for n seconds by a built-in counter. An initial value of the counter is zero. The detection unit 17 adds one to the value of the counter after standing by for n seconds.

After standing by for n seconds, the detection unit 17 transmits an off-hook simulation signal to the latch circuit 14, the off-hook simulation signal being electrically equivalent to an off-hook signal from the interphone master unit 9. Accordingly, the detection unit 17 cancels storing of the calling state by the latch circuit 14.

In a case where the user 15 pushes the phone call button 13 when storing of the calling state by the latch circuit 14 is canceled, the latch circuit 14 again stores the calling state. The latch circuit 14 transmits the signal indicating that the calling state is stored to the interphone master unit 9 and the remote monitoring device 12 through the control panel 7. The detection unit 17 receives the signal through the control panel 7 and thereby detects that the phone call button 13 is continuously pushed. When it is judged that the phone call button 13 is continuously pushed, the detection unit 17 retains the value of the counter.

On the other hand, in a case where the user 15 releases the phone call button 13 when storing of the calling state by the latch circuit 14 is canceled, storing of the calling state by the latch circuit 14 is kept being canceled. The latch circuit 14 does not transmit the signal indicating that the calling state is stored to the control panel 7. Accordingly, the detection unit 17 detects that the phone call button 13 is not continuously pushed. When it is judged that the phone call button 13 is not continuously operated, the detection unit 17 initializes the value of the counter to zero.

The detection unit 17 judges that the phone call button 13 is continuously pushed through the set time when the value of the counter becomes a threshold value M or greater. Here, the threshold value M is set as a value of the counter corresponding to N seconds being the set time, based on the value of n as a standby time. More specifically, for example, in a case where the set time is seven seconds and the standby time is one second, the value of the threshold value M is set as seven being the value resulting from division of the set time by the standby time.

In a case where the detection unit 17 judges that the phone call button 13 is continuously pushed through the set time, the communication control unit 18 performs a report process. The communication control unit 18 transmits a signal indicating a call from the interphone extension unit 8 whose phone call button 13 is pushed to the monitoring center 20 and thereby performs the report process. In the monitoring center 20, the operator 21 responds to the reported call from the IP phone 22. In a case where the operator 21 responds from the IP phone 22, the communication control unit 18 relays a phone call between the interphone extension unit 8 and the IP phone 22 through the control panel 7 and the modem 11. When the phone call between the interphone extension unit 8 and the IP phone 22 is finished, the latch circuit 14 of the interphone extension unit 8 stores the standby state.

On the other hand, in a case where it is judged that the phone call button 13 is not continuously pushed through the set time, the detection unit 17 transmits a simulation signal electrically equivalent to pressing of the phone call button 13, for example, to the latch circuit 14 of the interphone extension unit 8 whose phone call button 13 is pushed. Accordingly, the detection unit 17 causes the latch circuit 14 to again store the calling state. The interphone master unit 9 again continues to ring in the building manager room 4.

Next, by using FIG. 2 to FIG. 4, an example of communication of the emergency report system 1 will be described.

Figure 2:
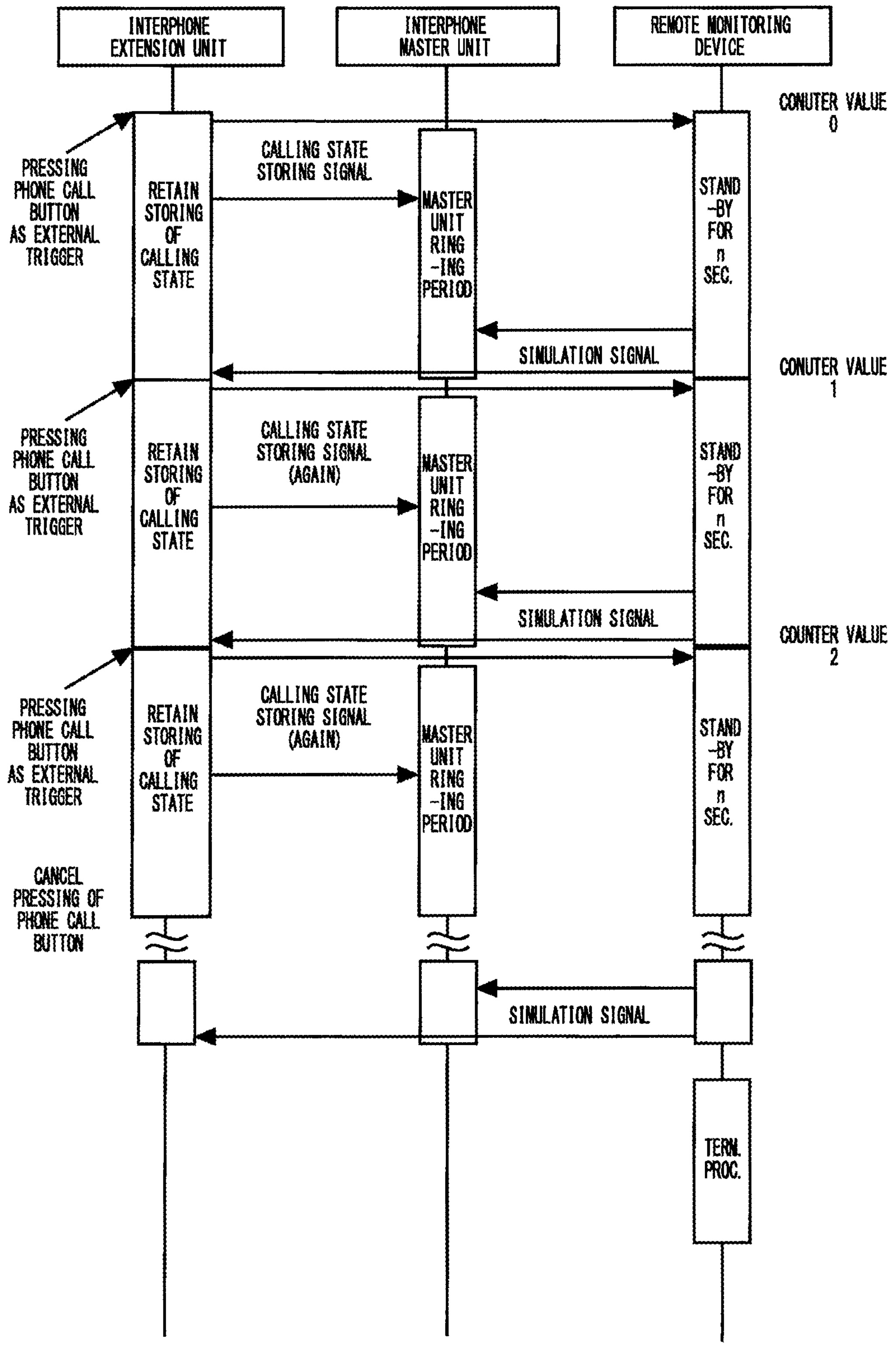
FIG. 2 is a diagram illustrating an example of communication in the emergency report system according to Embodiment 1.
Figure 3:
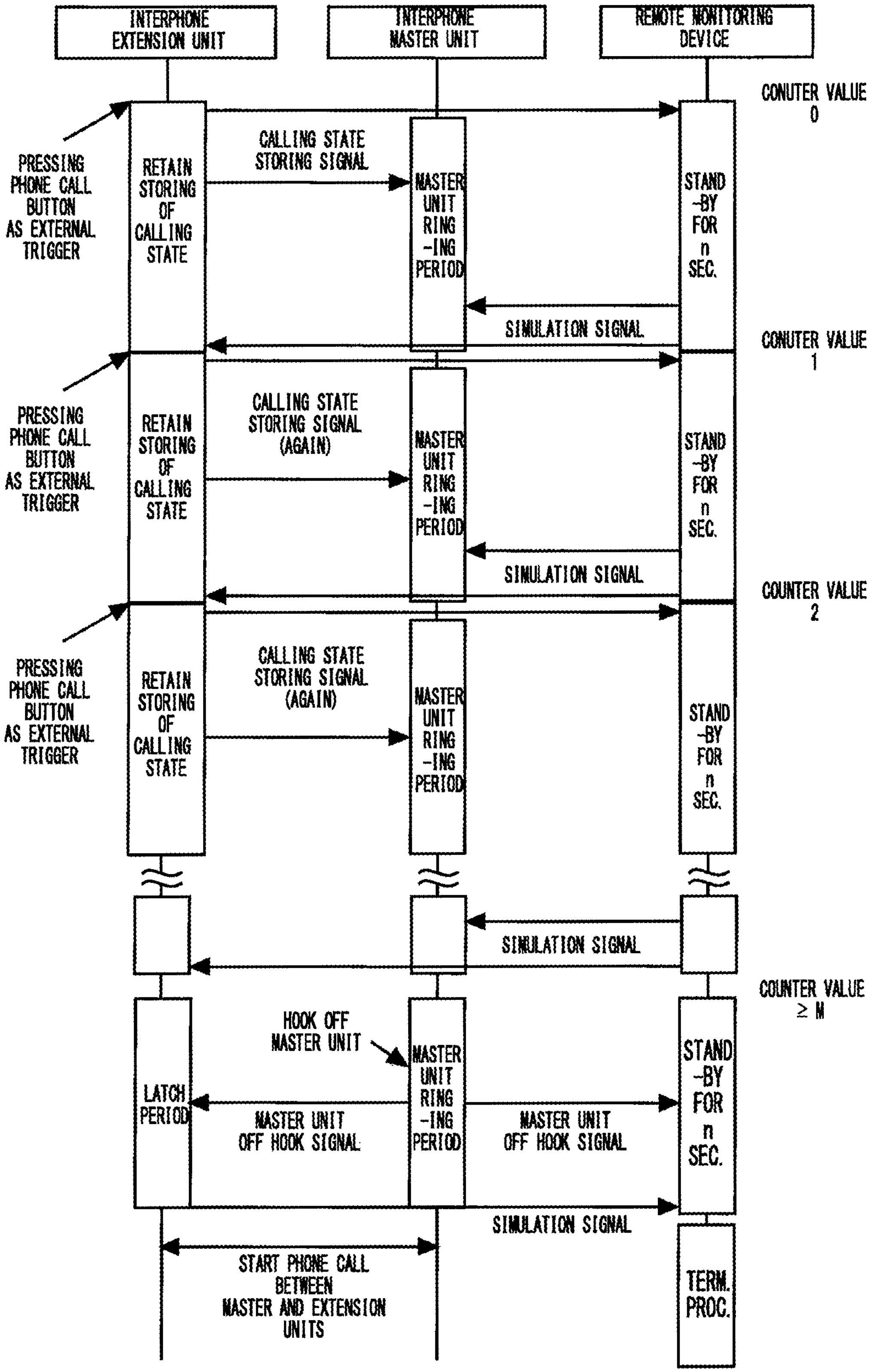
FIG. 3 is a diagram illustrating an example of communication in the emergency report system according to Embodiment 1.
Figure 4:
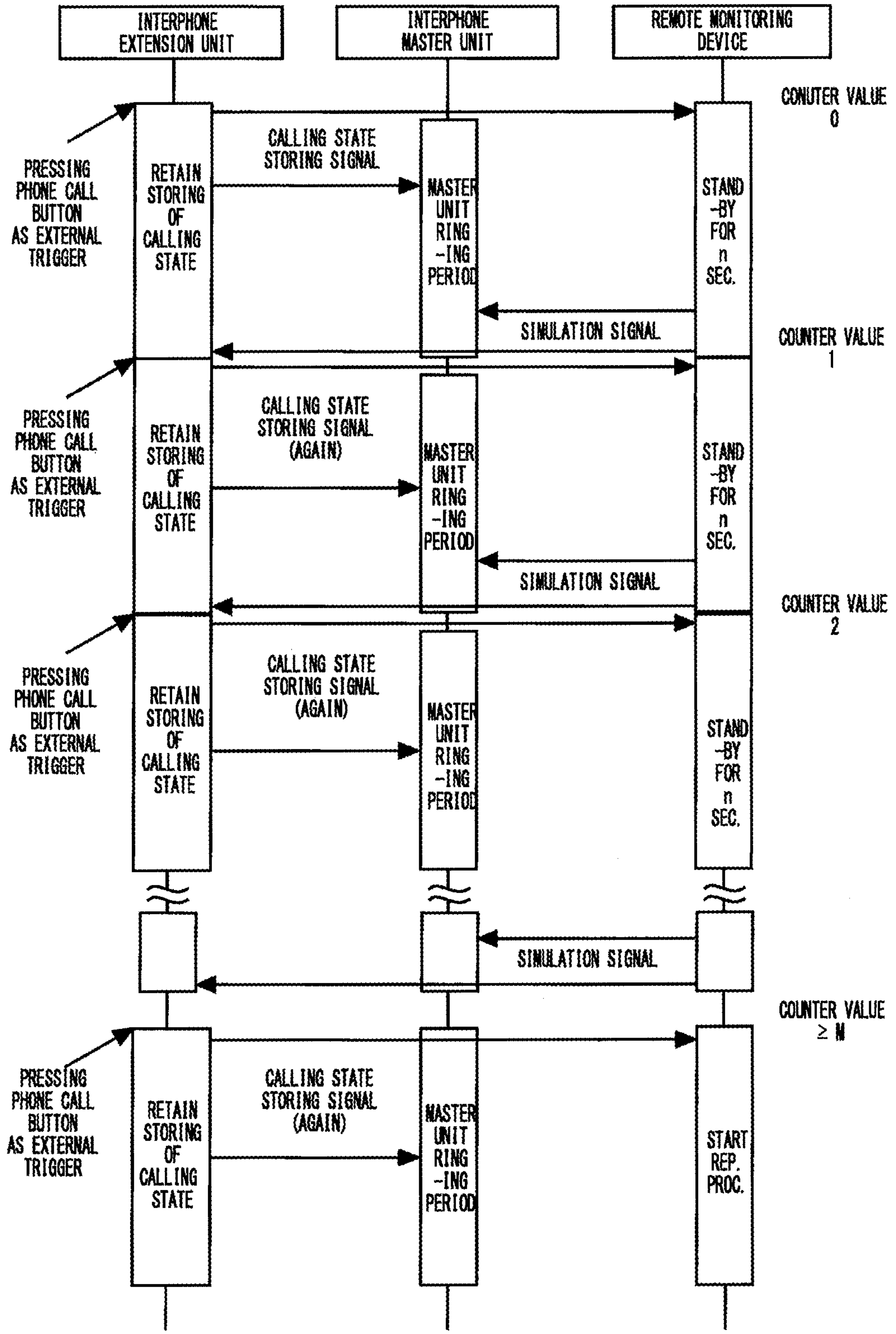
FIG. 4 is a diagram illustrating an example of communication in the emergency report system according to Embodiment 1.

FIG. 2 to FIG. 4 are diagrams illustrating examples of communication in the emergency report system according to Embodiment 1.

FIG. 2 illustrates an example of communication in a case where the phone call button 13 is released before the set time elapses after the detection unit 17 detects storing of the calling state by the latch circuit 14.

The user 15 riding any of the plural cars 6 pushes the phone call button 13 of the interphone extension unit 8 provided in the car 6. The latch circuit 14 of the interphone extension unit 8 detects that the phone call button 13 is pushed with a push on the phone call button 13 being an external trigger. The latch circuit 14 stores the calling state. The latch circuit 14 transmits the signal indicating that the calling state is stored to the interphone master unit 9 and the remote monitoring device 12.

The interphone master unit 9 rings based on the signal received from the latch circuit 14. At this point, the manager 16 does not hook off the handset of the interphone master unit 9.

The detection unit 17 of the remote monitoring device 12 detects storing of the calling state by the latch circuit 14 based on the signal received from the latch circuit 14. The detection unit 17 starts measurement of time by the timer. The detection unit 17 initializes the value of the counter to zero.

The communication control unit 18 judges that no response from the interphone master unit 9 is made. The detection unit 17 stands by for n seconds. The detection unit 17 thereafter adds one to the value of the counter. At this point, the value of the counter is one. The detection unit 17 transmits the off-hook simulation signal to the interphone extension unit 8 whose phone call button 13 is pushed and the interphone master unit 9. The latch circuit 14 of the interphone extension unit 8 receives the simulation signal and thereby cancels storing of the calling state. At this point, the user 15 continuously pushes the phone call button 13.

The latch circuit 14 of the interphone extension unit 8 whose phone call button 13 is pushed stores the calling state again with a push on the phone call button 13 being the external trigger. The latch circuit 14 transmits the signal indicating that the calling state is stored to the remote monitoring device 12 and the interphone master unit 9.

The detection unit 17 judges that the phone call button 13 is continuously pushed based on the signal received from the latch circuit 14. The detection unit 17 still retains the value of the counter at one. The detection unit 17 judges whether the value of the counter is the threshold value M or greater. At this point, the value of the counter is one which is less than M.

The interphone master unit 9 rings based on the signal received from the latch circuit 14. At this point, the manager 16 does not hook off the handset of the interphone master unit 9.

The communication control unit 18 judges that no response from the interphone master unit 9 is made. The detection unit 17 stands by for n seconds. The detection unit 17 thereafter adds one to the value of the counter. At this point, the value of the counter is two. The detection unit 17 transmits the off-hook simulation signal to the interphone extension unit 8 whose phone call button 13 is pushed and the interphone master unit 9. The latch circuit 14 of the interphone extension unit 8 receives the simulation signal and thereby cancels storing of the calling state.

After storing of the calling state performed again by the latch circuit 14 and cancellation of this are repeated, the user 15 releases the phone call button 13.

Storing of the calling state is kept being canceled, the storing being performed by the latch circuit 14 of the interphone extension unit 8 whose phone call button 13 is pushed. The latch circuit 14 does not transmit the signal indicating that the calling state is stored to the remote monitoring device 12 or the interphone master unit 9.

In this case, the interphone master unit 9 does not ring. The detection unit 17 judges that the phone call button 13 is not continuously pushed. The communication control unit 18 does not report a call from the interphone extension unit 8 whose phone call button 13 is pushed to the monitoring center 20. The remote monitoring device 12 thereafter performs a termination process such as stop of the timer.

FIG. 3 illustrates an example of communication in a case where a response from the interphone master unit 9 is made before the set time elapses after the detection unit 17 detects storing of the calling state by the latch circuit 14.

The user 15 riding any of the plural cars 6 pushes the phone call button 13 of the interphone extension unit 8 provided in the car 6.

After cancellation of storing of the calling state by the latch circuit 14 and storing performed again are repeated, the manager 16 responds by hooking off the handset of the interphone master unit 9. The interphone master unit 9 transmits the off-hook signal to the interphone extension unit 8 whose phone call button 13 is pushed and the remote monitoring device 12.

The state of the interphone extension unit 8 becomes a state in which a phone call with the interphone master unit 9 is enabled based on the received signal.

The communication control unit 18 detects a response from the interphone master unit 9 based on the received signal. The communication control unit 18 causes the control panel 7 to relay a phone call between the interphone extension unit 8 whose phone call button 13 is pushed and the interphone master unit 9. The detection unit 17 discontinues detecting that the phone call button 13 is continuously pushed. The remote monitoring device 12 thereafter performs the termination process.

FIG. 4 illustrates an example of communication in a case where the remote monitoring device 12 judges that the phone call button 13 is continuously pushed through the set time.

The user 15 riding any of the plural cars 6 pushes the phone call button 13 of the interphone extension unit 8 provided in the car 6.

After cancellation of storing of the calling state by the latch circuit 14 and storing performed again are repeated, the value of the counter of the detection unit 17 becomes the threshold value M or greater. In this case, the detection unit 17 judges that the phone call button 13 is continuously pushed through the set time. The communication control unit 18 thereafter starts a process of reporting a call from the interphone extension unit 8 whose phone call button 13 is pushed to the monitoring center 20.

Next, by using FIG. 5, a description will be made about the relationship between cancellation of storing of the calling state by the detection unit 17 and a judgment that the phone call button 13 is continuously pressed.

Figure 5:
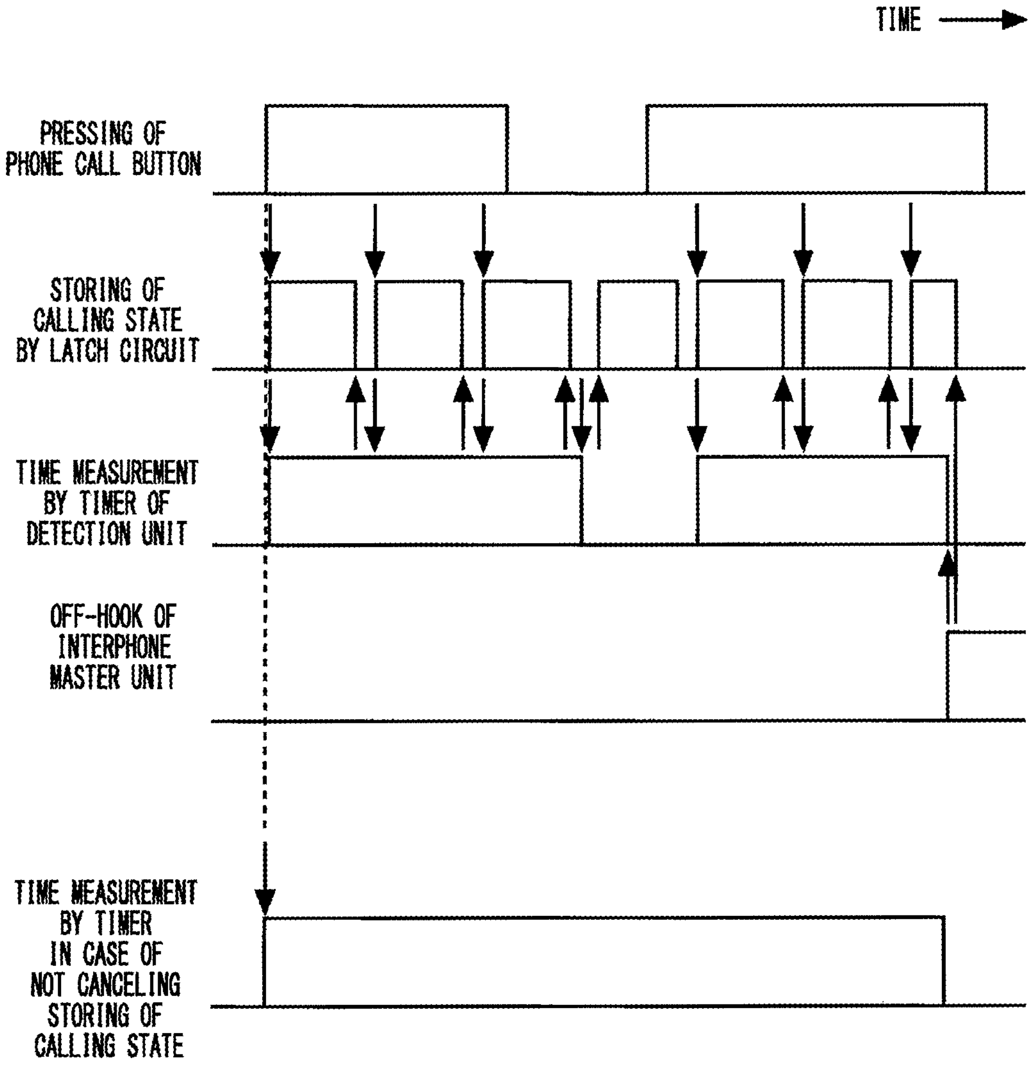
FIG. 5 is a diagram illustrating transition of the state in the emergency report system according to Embodiment 1.

FIG. 5 is a diagram illustrating transition of the state in the emergency report system according to Embodiment 1.

In FIG. 5, the right direction of the page is the direction in which time progresses. A state in which the phone call button 13 is pushed is illustrated by the first block from the top of FIG. 5. A state in which the calling state is stored by the latch circuit 14 is illustrated by the second block from the top of FIG. 5. A state in which the timer of the detection unit 17 measures time is illustrated by the third block from the top of FIG. 5. A state in which the interphone master unit 9 is hooked off is illustrated by the fourth block from the top of FIG. 5. For comparison with a state of the timer of the detection unit 17 according to Embodiment 1, a state in which the timer measures time in a case where cancellation of storing of the calling state is not performed is illustrated by the fifth block from the top of FIG. 5.

When the phone call button 13 is pressed, the latch circuit 14 stores the calling state. The detection unit 17 detects a start of pressing of the phone call button 13 based on the signal indicating storing of the calling state by the latch circuit 14. The detection unit 17 thereafter cancels storing of the calling state by the latch circuit 14.

The latch circuit 14 again stores the calling state when pressing of the phone call button 13 is continued. The detection unit 17 detects that pressing of the phone call button 13 is continued based on the signal indicating storing of the calling state by the latch circuit 14. The detection unit 17 thereafter cancels storing of the calling state by the latch circuit 14.

Storing of the calling state by the latch circuit 14 is kept being canceled when pressing of the phone call button 13 is not continued. The detection unit 17 detects that pressing of the phone call button 13 is not continued based on storing of the calling state by the latch circuit 14. The latch circuit 14 again stores the calling state in response to the simulation signal from the detection unit 17, for example.

As described above, the detection unit 17 may judge whether the phone call button 13 is continuously pressed based on the signal indicating a state of the latch circuit 14, without using a signal directly indicating a state of the phone call button 13. Further, even in a case where the phone call button 13 is once released, the detection unit 17 may judge whether the phone call button 13 is continuously pressed after the release. Thus, the detection unit 17 may judge whether a response from the interphone master unit 9 is made before the set time elapses after storing of the calling state by the latch circuit 14 is detected. Accordingly, the detection unit 17 may more certainly distinguish an unnecessary communication operation and a necessary communication operation with the monitoring center 20 on the outside of the elevator 2.

However, in a case where cancellation of storing of the calling state is not performed, storing of the calling state by the latch circuit 14 is retained even if pressing of the phone call button 13 is not continued. The detection unit 17 may not judge whether the phone call button 13 is continuously pressed based on storing of the calling state by the latch circuit 14. Thus, in a case where the phone call button 13 is once released, the detection unit 17 may not judge whether the phone call button 13 is continuously pressed after the release.

Next, by using FIG. 6, an example of a behavior of the emergency report system 1 will be described.

Figure 6:
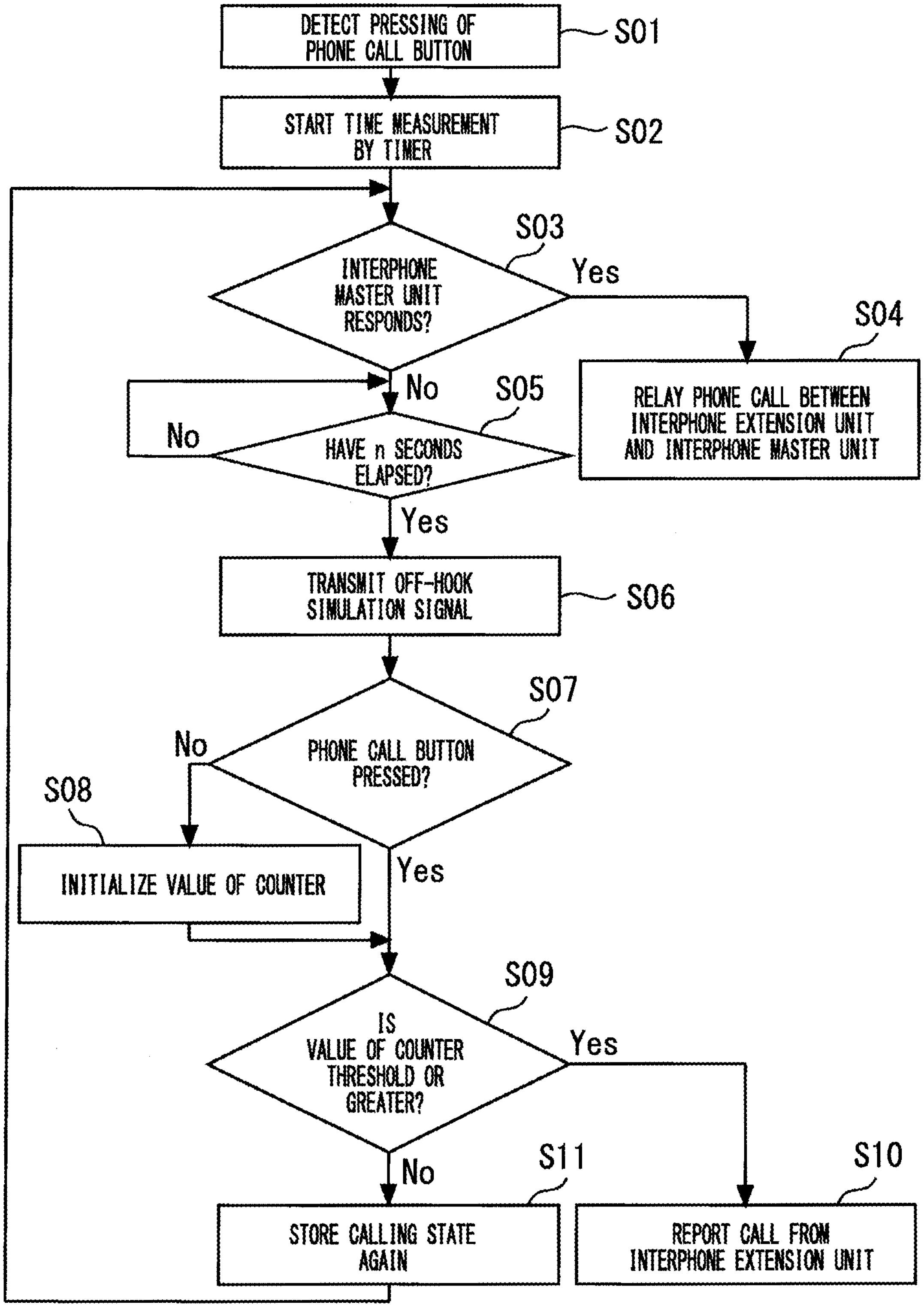
FIG. 6 is a flowchart illustrating an example of a behavior of the emergency report system according to Embodiment 1.

FIG. 6 is a flowchart illustrating an example of a behavior of the emergency report system according to Embodiment 1.

The behavior of the emergency report system 1 starts from detection of a push on the phone call button 13 by the latch circuit 14 in step S01. The behavior of the emergency report system 1 thereafter moves to step S02.

In step S02, the detection unit 17 starts measurement of time by the timer. The detection unit 17 initializes the value of the counter to zero. The behavior of the emergency report system 1 thereafter moves to step S03.

In step S03, the communication control unit 18 judges whether a response from the interphone master unit 9 is made. In a case where a judgment result is Yes, the behavior of the emergency report system 1 moves to step S04. In a case where a judgment result is No, the behavior of the emergency report system 1 moves to step S05.

In step S04, the communication control unit 18 causes the control panel 7 to relay a phone call between the interphone extension unit 8 whose phone call button 13 is pushed and the interphone master unit 9. The remote monitoring device 12 thereafter performs the termination process. The behavior of the emergency report system 1 is thereafter finished.

In step S05, the detection unit 17 judges whether n seconds have elapsed after it is judged whether a response from the interphone master unit 9 is made. In a case where a judgment result is No, the behavior of the emergency report system 1 again moves to step S05. In a case where a judgment result is Yes, the communication control unit 18 adds one to the value of the counter. The behavior of the emergency report system 1 thereafter moves to step S06.

In step S06, the detection unit 17 transmits the off-hook simulation signal to the latch circuit 14 of the interphone extension unit 8 whose phone call button 13 is pushed. The latch circuit 14 thereafter cancels storing of the calling state. The behavior of the emergency report system 1 thereafter moves to step S07.

In step S07, the detection unit 17 judges whether the phone call button 13 is continuously pushed. In a case where a judgment result is No, the behavior of the emergency report system 1 moves to step S08. In a case where a judgment result is Yes, the behavior of the emergency report system 1 moves to step S09.

In step S08, the detection unit 17 initializes the value of the counter to zero. The behavior of the emergency report system 1 thereafter moves to step S09.

In step S09, the detection unit 17 judges whether the value of the counter is a threshold value or greater. In a case where a judgment result is Yes, the behavior of the emergency report system 1 moves to step S10. In a case where a judgment result is No, the behavior of the emergency report system 1 moves to step S11.

In step S10, the communication control unit 18 reports a call from the interphone extension unit 8 whose phone call button 13 is pushed to the monitoring center 20. The remote monitoring device 12 thereafter performs the termination process. The behavior of the emergency report system 1 is thereafter finished.

In step S11, the detection unit 17 causes the latch circuit 14 to again store the calling state. Here, in a case where the latch circuit 14 already stores the calling state, the latch circuit 14 retains storing of the calling state. The behavior of the emergency report system 1 thereafter moves to step S03.

As described above, the emergency report system 1 includes the latch circuit 14 and the detection unit 17. The latch circuit 14 stores the calling state when the phone call button 13 of the interphone extension unit 8 is pressed inside the car 6 of the elevator 2. The latch circuit 14 retains storing of the calling state even after pressing of the phone call button 13 is finished. The detection unit 17 cancels storing of the calling state by the latch circuit 14 at a time interval set in advance. The detection unit 17 detects storing of the calling state again performed by the latch circuit 14 and thereby detects that pressing of the phone call button 13 is continued.

Further, the emergency report system 1 includes the interphone extension unit 8 and the remote monitoring device 12. The interphone extension unit 8 is provided inside the car 6 of the elevator 2. The interphone extension unit 8 stores the calling state when the phone call button 13 is pressed. The interphone extension unit 8 retains storing of the calling state even after pressing of the phone call button 13 is finished. The remote monitoring device 12 cancels storing of the calling state by the interphone extension unit 8 at a time interval set in advance. The remote monitoring device 12 detects storing of the calling state again performed by the interphone extension unit 8 and thereby detects that pressing of the phone call button 13 is continued.

In the emergency report system 1, the calling state is stored when the phone call button 13 of the interphone extension unit 8 is pressed inside of the car 6 of the elevator 2. Storing of the calling state is retained even after pressing of the phone call button 13 is finished. Continuation of pressing of the phone call button 13 is detected by detecting storing of the calling state performed again, the storing being canceled at a time interval set in advance. Accordingly, it may be detected that pressing of the phone call button 13 is continued based on the calling state retained even after pressing of the phone call button 13 is finished.

Further, the latch circuit 14 is provided to the interphone extension unit 8.

Accordingly, the emergency report system 1 may be applied to an existing elevator by adding the remote monitoring device 12. Here, a system including an interphone extension unit and an interphone master unit is applied to the existing elevator. The interphone extension unit is provided in a car of the existing elevator. The interphone extension unit includes a latch circuit. The interphone master unit is provided in a place on the outside of the car of the existing elevator.

The detection unit 17 judges whether the phone call button 13 is continuously pressed based on the signal indicating the state of the latch circuit 14, without using a signal directly indicating the state of the phone call button 13. Thus, wiring between the interphone extension unit 8 and the remote monitoring device 12 becomes simple.

Further, the emergency report system 1 includes the communication control unit 18. The interphone master unit 9 rings in a place on the outside of the car 6 while storing of the calling state by the latch circuit 14 is retained. In a case where a response from the interphone master unit 9 is made before the set time set in advance elapses after pressing of the phone call button 13, the communication control unit 18 enables a phone call between the interphone extension unit 8 and the interphone master unit 9. In a case where the phone call button 13 is continuously pressed through the set time, the communication control unit 18 reports a call from the interphone extension unit 8 to the monitoring center 20 on the outside of the elevator 2.

Further, the emergency report system 1 includes the interphone master unit 9. The interphone master unit 9 is provided in a place on the outside of the car 6. The interphone master unit 9 rings while storing of the calling state is retained by the interphone extension unit 8. In a case where a response from the interphone master unit 9 is made before the set time set in advance elapses after pressing of the phone call button 13, the remote monitoring device 12 enables a phone call between the interphone extension unit 8 and the interphone master unit 9. In a case where the phone call button 13 is continuously pressed through the set time, the remote monitoring device 12 reports a call from the interphone extension unit 8 to the monitoring center 20 on the outside of the elevator 2.

In the emergency report system 1, the calling state is stored when the phone call button 13 of the interphone extension unit 8 is pressed inside the car 6 of the elevator 2. Storing of the calling state is retained even after pressing of the phone call button 13 is finished. The interphone master unit 9 rings while storing of the calling state is retained. In a case where a response from the interphone master unit 9 is made before the set time elapses after pressing of the phone call button 13, a phone call is made between the interphone extension unit 8 and the interphone master unit 9. In a case where the phone call button 13 is continuously pressed through the set time, the emergency report system 1 reports a call from the interphone extension unit 8 to the monitoring center 20 on the outside of the elevator 2. Accordingly, both of a start of a phone call to the outside of the car 6 by an easy operation and inhibition of unnecessary communication with the monitoring center 20 on the outside of the elevator 2 are achieved.

Here, the unnecessary communication with the monitoring center 20 on the outside of the elevator 2 includes communication due to an incorrect operation by the user 15 or a mischief, for example. A report to the monitoring center 20 is performed in a case where continuation of pressing of the phone call button 13 is detected. Thus, in a case where the user 15 touches the phone call button 13 for a shorter time than the set time by mistake, the remote monitoring device 12 does not perform a report to the monitoring center 20. Accordingly, unnecessary communication with the monitoring center 20 is inhibited. Further, a communication cost is reduced.

Due to a situation or the like in an emergency, the user 15 possibly releases the phone call button 13 immediately after once pushing the phone call button 13. Even in such a case, the latch circuit 14 retains storing of the calling state. While the latch circuit 14 retains storing of the calling state, the interphone master unit 9 rings. That is, the interphone master unit 9 rings even after the user 15 releases the phone call button 13. Thus, the manager 16 may respond from the interphone master unit 9 after the user 15 releases the phone call button 13. Accordingly, the user 15 may start a phone call to the outside of the car 6 by an easy operation without performing an additional operation following an instruction given on the spot.

In hours or the like in which the manager 16 is not present in the building manager room 4, the user 15 may make a phone call to the operator 21 of the monitoring center 20 by continuously pushing the phone call button 13. Thus, the user 15 may have plural paths for contacting the outside of the car 6 in an emergency. Accordingly, the user 15 may more certainly contact the outside of the car 6 in an emergency.

Further, the detection unit 17 transmits a signal simulating a response from the interphone master unit 9 to the latch circuit 14 and thereby cancels storing of the calling state.

Accordingly, it is not necessary to develop an interface for the interphone extension unit 8. Thus, as the interphone extension unit 8 in the emergency report system 1, a popularized interphone may be used on which the latch circuit 14 is mounted. An installation cost of the emergency report system 1 is reduced.

Further, the detection unit 17 cancels storing of the calling state by the latch circuit 14 after the communication control unit 18 judges that no response from the interphone master unit 9 is made.

Accordingly, priority is given to a response of the manager 16 in the building manager room 4 over a response of the operator 21 in the monitoring center 20. The building manager room 4 is closer to the car 6 which the user 15 rides than the monitoring center 20 on the outside of the elevator 2. Further, the manager 16 is more familiar with the local situation of the elevator 2 used by the user 15 than the operator 21 monitoring plural elevators 2. Thus, priority is given to a response of the manager 16, and thereby the user 15 is more quickly and appropriately dealt with. Further, priority is given to a response of the manager 16 which does not accompany communication with the monitoring center 20, and a communication cost is thereby reduced.

Further, the detection unit 17 judges that pressing of the phone call button 13 is not continued and thereafter causes the latch circuit 14 to again store the calling state.

Accordingly, even in a case where the user 15 releases the phone call button 13, the interphone master unit 9 continuously rings after the detection unit 17 cancels storing of the calling state by the latch circuit 14. Thus, it becomes easy for the manager 16 to respond.

Further, the indicator 10 is lit while the latch circuit 14 of the interphone extension unit 8 provided to the corresponding car 6 retains storing of the calling state. Accordingly, the manager 16 may identify the car 6, which the user 15 pushing the phone call button 13 rides, before a response.

Note that the elevator 2 may include only one car 6. The emergency report system 1 may include only one interphone extension unit 8. The emergency report system 1 may include plural interphone master units 9.

The first telephone and the second telephone may be house phones or IP phones, for example.

The state storing unit may be hardware, software, or the like other than the latch circuit 14. The state storing unit may be provided to the remote monitoring device 12, the interphone master unit 9, or the control panel 7, for example. Plural state storing units may be provided for one phone call button 13.

The indication device may be a device other than the plural indicators 10, the device notifying the car 6 which the user 15 pushing the phone call button 13 rides to the manager 16. The indication device may be provided to the interphone master unit 9. Indication by the indication device may be indicated together with a picture for monitoring the inside of each of the plural cars 6.

In a case where a response from the interphone master unit 9 is made while the detection unit 17 stands by for n seconds, the communication control unit 18 may cause the control panel 7 to relay a phone call between the interphone extension unit 8 whose phone call button 13 is pushed and the interphone master unit 9.

After it is judged that the phone call button 13 is not continuously pressed, the detection unit 17 may not cause the latch circuit 14 to again store the calling state in a case where a time defined in advance elapses after the phone call button 13 is pressed. The emergency report system 1 may provide an upper limit for a time in which the interphone master unit 9 continuously rings in the building manager room 4.

After it is judged that the phone call button 13 is not continuously pressed, the detection unit 17 may not cause the latch circuit 14 to again store the calling state. The interphone master unit 9 does not continuously ring for a long time in a case where the phone call button 13 is pushed by an incorrect operation, a mischief, or the like. Thus, the manager 16 may have less trouble with handling.

Time intervals at which the detection unit 17 cancels storing of the calling state by the latch circuit 14 may be unequal intervals. For example, the detection unit 17 may set the first time interval longer than the next time interval. Even in a case where the phone call button 13 is released immediately after the user 15 pushes the phone call button 13, a time for the interphone master unit 9 to ring is secured. Accordingly, it becomes easy for the manager 16 to respond from the interphone master unit 9.

The set time stored in the detection unit 17 may be set by the manager 16, the operator 21, or the like. The time interval at which the detection unit 17 cancels storing of the calling state by the latch circuit 14 may be set by the manager 16, the operator 21, or the like.

The building manager room 4 may be provided in a separate building from the building 3 in which the elevator 2 is provided.

In the elevator 2, the machine room 5 may not be provided. In this case, the control panel 7, the remote monitoring device 12, the modem 11, and so forth are provided in the shaft, for example.

Plural portions of the control panel 7 may be included in separate bodies. The control panel 7 may include a portion for performing control of the motion of each of the plural cars 6 and a portion for performing group control for the plural cars 6.

A portion or the whole of the remote monitoring device 12 may integrally be provided with the control panel 7.

The information center 19 and the monitoring center 20 may be the same base. Each of the information center 19 and the monitoring center 20 may be formed with plural bases. A web server may be provided in the information center 19. The operator 21 of the monitoring center 20 may access information accumulated in the information center 19 via a web client. The information center 19 may accumulate information indicating contents of phone calls between the interphone extension unit 8 and the IP phone 22.

Connection among systems, devices, machines, portions, and so forth in Embodiment 1 may be either of direct or indirect connection. Communication among systems, devices, machines, portions, and so forth in Embodiment 1 may be either of direct or indirect communication.

Next, an example of a hardware configuration of the emergency report system 1 will be described by using FIG. 7.

Figure 7:
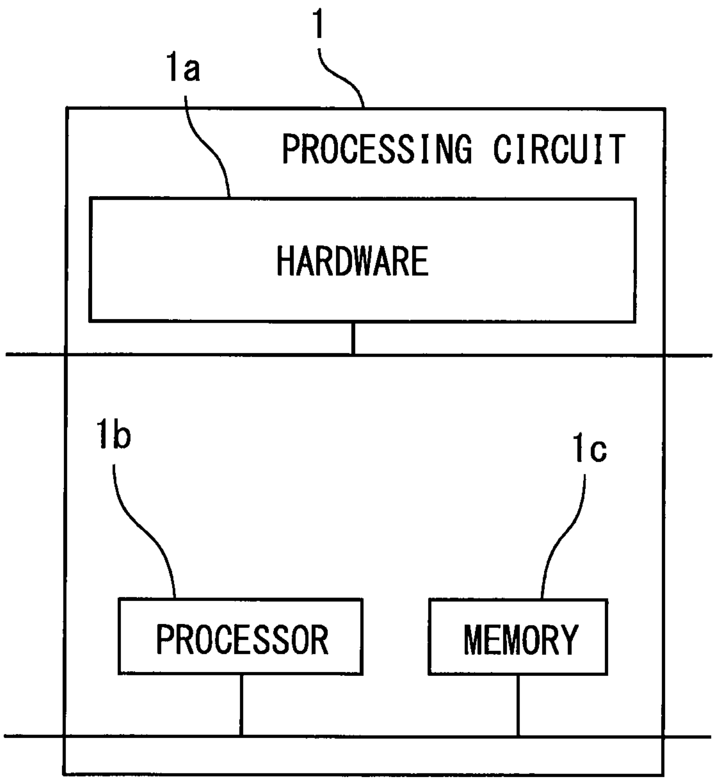
FIG. 7 is a diagram illustrating a hardware configuration of principle portions of the emergency report system according to Embodiment 1.

FIG. 7 is a diagram illustrating a hardware configuration of principle portions of the emergency report system according to Embodiment 1.

Each function of the emergency report system 1 may be realized by a processing circuit. The processing circuit includes at least one processor 1*b* and at least one memory 1*c*. The processing circuit may include at least one piece of dedicated hardware 1*a* together with the processor 1*b* and the memory 1*c* or instead of those.

In a case where the processing circuit includes the processor 1*b* and the memory 1*c*, each function of the emergency report system 1 is realized as software, firmware, or a combination of software and firmware. At least one of the software and the firmware is described as a program. The program is stored in the memory 1*c*. The processor 1*b* realizes each function of the emergency report system 1 by reading out and executing the program stored in the memory 1*c*.

The processor 1*b* is also referred to as CPU (central processing unit), processing device, arithmetic operation device, microprocessor, microcomputer, or DSP. The memory 1*c* is configured with a non-volatile or volatile semiconductor memory such as a RAM, a ROM, a flash memory, an EPROM, or an EEPROM, a magnetic disk, a flexible disk, an optical disk, a compact disc, a MiniDisc, a DVD, or the like.

In a case where the processing circuit includes the dedicated hardware 1*a*, the processing circuit is realized by a single circuit, a composite circuit, a processor formed as a program, a processor formed as a parallel program, an ASIC, an FPGA, or a combination of those, for example.

Each function of the emergency report system 1 may be realized by a processing circuit. Alternatively, functions of the emergency report system 1 may integrally be realized by a processing circuit. As for each function of the emergency report system 1, a portion may be realized by the dedicated hardware 1*a*, and the other portions may be realized by software or firmware. As described above, the processing circuit realizes each function of the emergency report system 1 by the hardware Ta, software, firmware, or a combination of those.

INDUSTRIAL APPLICABILITY

An emergency report system according to the present invention may be applied to an elevator.

REFERENCE SIGNS LIST

1 Emergency report system
2 Elevator
3 Building
4 Building manager room
5 Machine room
6 Car
7 Control panel
8 Interphone extension unit
9 Interphone master unit
10 Indicator
11 Modem
12 Remote monitoring device
13 Phone call button
14 Latch circuit
15 User
16 Manager
17 Detection unit
18 Communication control unit
19 Information center
20 Monitoring center
21 Operator
22 IP phone
1*a* Hardware
1*b* Processor
1*c* Memory

The invention claimed is:

1. An emergency report system for an elevator, the emergency report system comprising:

state storing circuitry to store a calling state when a calling device of a first telephone is operated inside a car of the elevator, and to retain storing of the calling state even after an operation of the calling device is finished; and detection circuitry to cancel storing of the calling state by the state storing circuitry at a time interval set in advance, and to detect that the operation of the calling device is continued by detecting storing of the calling state, the storing being again performed by the state storing circuitry.

2. The emergency report system for the elevator according to claim 1, wherein the state storing circuitry is provided to the first telephone.

3. The emergency report system for the elevator according to claim 2, further comprising:

communication control circuitry to enable a phone call between the first telephone and a second telephone in a case where a response from the second telephone is made before a set time set in advance elapses after the detection circuitry detects storing of the calling state by the state storing circuitry, the second telephone ringing in a place on an outside of the car while storing of the calling state is retained by the state storing circuitry, and to report a call from the first telephone to a monitoring center on an outside of the elevator in a case where the calling device is continuously operated through the set time.

4. The emergency report system for the elevator according to claim 3, wherein the detection circuitry cancels storing of the calling state by transmitting a signal simulating the response from the second telephone to the state storing circuitry.

5. The emergency report system for the elevator according to claim 4, wherein the detection circuitry cancels storing of the calling state by the state storing circuitry after the communication control circuitry judges that the response from the second telephone is not made.

6. The emergency report system for the elevator according to claim 5, wherein the detection circuitry causes the state storing circuitry to again store the calling state after judging that the operation of the calling device is not continued.

7. The emergency report system for the elevator according to claim 4, wherein the detection circuitry causes the state storing circuitry to again store the calling state after judging that the operation of the calling device is not continued.

8. The emergency report system for the elevator according to claim 3, wherein the detection circuitry cancels storing of the calling state by the state storing circuitry after the communication control circuitry judges that the response from the second telephone is not made.

9. The emergency report system for the elevator according to claim 8, wherein the detection circuitry causes the state storing circuitry to again store the calling state after judging that the operation of the calling device is not continued.

10. The emergency report system for the elevator according to claim 3, wherein the detection circuitry causes the state storing circuitry to again store the calling state after judging that the operation of the calling device is not continued.

11. The emergency report system for the elevator according to claim 1, further comprising communication control circuitry to enable a phone call between the first telephone and a second telephone in a case where a response from the second telephone is made before a set time set in advance elapses after the detection circuitry detects storing of the calling state by the state storing circuitry, the second telephone ringing in a place on an outside of the car while storing of the calling state is retained by the state storing circuitry, and to report a call from the first telephone to a monitoring center on an outside of the elevator in a case where the calling device is continuously operated through the set time.

12. The emergency report system for the elevator according to claim 11, wherein the detection circuitry cancels storing of the calling state by transmitting a signal simulating the response from the second telephone to the state storing circuitry.

13. The emergency report system for the elevator according to claim 12, wherein the detection circuitry cancels storing of the calling state by the state storing circuitry after the communication control circuitry judges that the response from the second telephone is not made.

14. The emergency report system for the elevator according to claim 13, wherein the detection circuitry causes the state storing circuitry to again store the calling state after judging that the operation of the calling device is not continued.

15. The emergency report system for the elevator according to claim 12, wherein the detection circuitry causes the state storing circuitry to again store the calling state after judging that the operation of the calling device is not continued.

16. The emergency report system for the elevator according to claim 11, wherein the detection circuitry cancels storing of the calling state by the state storing circuitry after the communication control circuitry judges that the response from the second telephone is not made.

17. The emergency report system for the elevator according to claim 16, wherein the detection circuitry causes the state storing circuitry to again store the calling state after judging that the operation of the calling device is not continued.

18. The emergency report system for the elevator according to claim 11, wherein the detection circuitry causes the state storing circuitry to again store the calling state after judging that the operation of the calling device is not continued.

19. An emergency report system for an elevator, the emergency report system comprising:

a first telephone being provided in an internal portion of a car of the elevator, storing a calling state when a calling device is operated, and retaining storing of the calling state even after an operation of the calling device is finished; and an emergency report device canceling storing of the calling state by the first telephone at a time interval set in advance, the emergency report device detecting that the operation of the calling device is continued by detecting storing of the calling state, the storing being again performed by the first telephone.

20. The emergency report system for the elevator according to claim 19, further comprising a second telephone being provided in a place on an outside of the car and ringing while storing of the calling state is retained by the first telephone, wherein the emergency report device enables a phone call between the first telephone and the second telephone in a case where a response from the second telephone is made before a set time set in advance elapses after storing of the calling state by the first telephone is detected and reports a call from the first telephone to a monitoring center on an outside of the elevator in a case where the calling device is continuously operated through the set time.

* * * * *